United States Patent [19]
Fleckenstein

[11] Patent Number: 5,919,109
[45] Date of Patent: Jul. 6, 1999

[54] DRIVE AXLE WITH PLANETARY GEAR

[75] Inventor: Franz Fleckenstein, Mainaschaff, Germany

[73] Assignee: Linde Aktiengesellschaft, Germany

[21] Appl. No.: 08/951,267

[22] Filed: Oct. 16, 1997

[30] Foreign Application Priority Data

| Oct. 16, 1996 | [DE] | Germany | 196 42 749 |
| Nov. 21, 1996 | [DE] | Germany | 196 48 274 |
| Sep. 18, 1997 | [DE] | Germany | 197 41 207 |

[51] Int. Cl.[6] .................................................. F16H 1/46
[52] U.S. Cl. .......................................................... 475/151
[58] Field of Search ............................... 475/18, 28, 151, 475/150, 332; 180/65.5

[56] References Cited

U.S. PATENT DOCUMENTS

| 650,837 | 6/1900 | Heath | 475/150 |
| 1,144,752 | 6/1915 | Bock | 180/65.5 |
| 1,348,539 | 8/1920 | Breitenbach | 475/151 |
| 2,027,218 | 1/1936 | Armington | 475/28 |
| 2,047,050 | 7/1936 | Armington | 475/28 |
| 2,874,790 | 2/1959 | Hennessey | 180/65.5 |
| 4,406,340 | 9/1983 | Gennaux | 180/65.5 |
| 5,396,968 | 3/1995 | Hasebe et al. | 475/150 |
| 5,509,491 | 4/1996 | Hall, III | 475/28 |

*Primary Examiner*—Dirk Wright
*Attorney, Agent, or Firm*—Webb Ziesenheim Logsdon Orkin & Hanson, P.C.

[57] ABSTRACT

A drive axle has a drive motor and two reduction gearsets located on the ends of the axle to drive respective wheels. The input stages of the reduction gearsets are formed as common single-stage planetary gear train. The planetary gear train is connected to the final stages of the reduction gearsets by respective output shafts. The planetary gear train has a rotatable sun wheel, a rotatable planet carrier and a rotatable ring gear. In one embodiment, the sun wheel of the planetary gear train is in a drive connection with an input shaft, and the planet carrier is connected to a first output shaft, and the ring gear of the planetary gear train is connected to a second output shaft. The output shafts are each formed as a sun wheel of the reduction gearsets. The output of the first reduction gearset is via the planet carrier and the ring gear of the first reduction gearset is stationary relative to the axle housing. The output of the second reduction gearset is by the ring gear, and the planet carrier of the second reduction gearset is stationary relative to the axle housing.

20 Claims, 4 Drawing Sheets

DRIVE AXLE WITH PLANETARY GEAR

BACKGROUND OF THE INVENTION

1. Field of the Invention

The present invention relates to a drive axle with a drive motor and two reduction gearsets, in particular in the form of planetary gearsets located on the ends of the axle. The reduction gearsets are provided to drive the respective wheels, and the power flow from the drive motor to the driven wheel via an input stage and at least one final stage of the reduction gearsets.

2. Background of the Invention

Drive axles are used in motor vehicles. Reduction gearsets are located between a drive motor and the driven wheels to achieve a corresponding reduction of the speed of rotation and thus an increase in the torque transmitted to the driven wheels. Each transmission has at least one transmission stage. In drive axles of the prior art, the reduction gearset is in the form of a multi-stage reduction gear train, in particular a planetary gear train, generally having two stages, whereby the first transmission stage forms an input stage and the second transmission stage forms a final stage. Such drive axles with a two-stage planetary gear train as the reduction gearset therefore have two planetary gear trains with a total of four planetary stages. On two stage reduction gearsets which are in the form of spur gear systems, there are four transmission stages. The result is a complex and expensive construction for the drive axle.

SUMMARY OF THE INVENTION

The object of this invention is to make available a drive axle of the type described above which has fewer components and is less complex and expensive to manufacture. This object can be accomplished by forming the input stages of the reduction gearsets as a common, single-stage planetary gear train which is connected to the final stages of the two reduction gearsets by respective output shafts.

A drive axle according to the present invention includes a drive motor, a common single stage planetary gear train driven by the motor and a pair of reduction gearsets. Each train driven by the motor and a pair of reduction gearsets. Each reduction gearset is driving one respective wheel and driven by one output shaft of the common single stage planetary gear train.

Compared to the prior art drive axles, the drive axle of the invention has fewer components. Instead of two multi-stage reduction gearsets, a common transmission input stage is used in the invention. Consequently, the structure of the reduction gearsets, and thus of the drive axle, can be simplified by eliminating components, thereby reducing manufacturing costs.

With two drive shafts, each effectively connected to the final stages of the reduction gearsets, an equalization of the different rotational speeds of the driven wheels also becomes possible when the vehicle is traveling around a curve. The function of a differential gearset is also achieved as a result of the replacement in the invention of the input stages of the reduction gearsets by a common single-stage planetary gear train with two output shafts. The cost and complexity of the drive axle is thereby significantly reduced. An independent differential gearset is eliminated in the invention as compared to the prior art drive axles. The reduction of the space required for installation of the drive axle is an additional advantage. There is also a reduction of the manufacturing costs.

In one embodiment of the invention, the planetary gear train has a rotating sun wheel, a rotating planet carrier and a rotating ring gear, whereby a rotating component of the planetary gear train is in a drive connection with an input shaft. Rotating components of the planetary gear train are effectively connected to a first output shaft, and to a second output shaft, respectively, to drive the reduction gearsets. The sun wheel, the planet carrier and the ring gear of the planetary gear train can rotate independently of one another and can have different speeds of rotation, whereby, through a suitable selection of the input and output elements of the planetary gear train, it is possible to achieve any desired gear ratio step-up or reduction between the input shaft and the output shafts of the planetary gear train.

With the output shafts of the planetary gear train rotatable independently of one another, a simple equalization of the rotational speeds of the driven wheels may be achieved as the characteristics of the road change, or when the vehicle equipped with the drive axle of the invention travels around a curve. On a drive axle of the invention, in contrast to prior art vehicle drive axles there is no need for an independent differential gearset. The function of the differential transmission is integrated into the common transmission input stage which is formed as a single stage planetary gear train. The planetary gear train thus combines the function of the differential transmission gearset and the transmission input stages of the reduction gearset. Consequently, the number of components of the drive axle of the invention is less than in the prior art drive axles.

In one embodiment of the invention, the sun wheel of the planetary gear train is effectively connected to the input shaft, and the planet carrier is in a drive connection with the first output shaft, and the ring gear is connected to the second output shaft. The result is different speeds and directions of rotation on the output shafts. The input through the sun wheel and the outputs, via the planet carriers, and the ring gear of the planetary gear train, also make possible a reduction of the gear ratio between the input shaft and the output shafts. In this manner, an initial reduction of the input speed of the drive motor is achieved. As a result, one transmission stage can be eliminated in the reduction gearsets.

In a second embodiment of the invention, the input shaft is in a drive connection with the ring gear, whereby each output shaft is connected respectively to the sun wheel and the planet carrier. By an appropriate selection of the geometry of the rotating components, therefore, any desired translation ratio can be achieved between the input shaft and the respective output shaft. For a gear ratio step-up between the input shaft and an output shaft, for example, the diameter of the output shaft can be reduced, because a lower torque needs to be transmitted to the reduction gearset. The planet carrier can also be effectively connected to the input shaft, and the sun wheel and the ring gear can be provided as the output element.

In another embodiment of the invention, the reduction gearsets are formed as single-stage planetary gear trains. When the sun wheel of the planetary gear train is driven and there is a first reduction of the input speed of rotation in the planetary gear train, the construction of the reduction gearset can be reduced by one transmission stage, so that all that is required in the reduction gearsets is a final stage. The increase in the torque from the drive motor to the driven wheel therefore takes place in the planetary gear train and in the reduction gearsets. Compared to the prior art drive axles, therefore, the drive axle of the invention has three planetary gear trains with a total of only three planet stages. As a result of the elimination of the transmission input stages on the reduction gearsets and the independent differential gearset, additional space is thus made available in the axial direction in the axle housing for the existing components or for additional components.

The output shafts of the planetary gear train may be formed as a sun wheel of the reduction gearsets. The output of the first reduction gearset may be via the planet carrier, wherein the ring gear is stationary relative to the axle housing. The output of the second reduction gearset may be via the ring gear, wherein the planet carrier is stationary relative to the axle housing. The different speeds of rotation and the different directions of rotation of the output shafts in the planetary gear train are thereby equalized by two different final stages in the reduction gearsets.

In one embodiment of the invention, the reduction gearsets are formed as single stage pinion gear systems. In one spur gear system, the direction of rotation of the output shaft is reversed. The final stages of the reduction gearsets are single-stage spur gear systems. The different directions of rotation are equalized in a spur gear system. The result is also a system which has only three gear stages. This eliminates a transmission input stage and an independent differential gearset of the prior art and makes possible the simple construction of the drive axle of the invention. The pinion gear systems may each have a pair of gear wheels, wherein one pinion gear system has an intermediate gear wheel located between the pair of gear wheels. The intermediate gear wheel achieves a reversal of the rotation direction of the spur gear system. This easily compensates for different directions of rotation of the output shaft of the planetary gear train and the spur gear system.

In one embodiment of the invention, the input shaft is formed as a hollow shaft and is oriented coaxial to the output shafts and surrounds one of the output shafts. It thereby becomes possible to reduce the amount of space required for the installation of the drive axle in the radial direction, because an output shaft runs through the center of the input shaft and the output shafts are oriented coaxial to the input shaft.

Furthermore, the input shaft may be formed as a shaft of a drive motor which is located in the axle housing, and the shaft is supported in the axle housing by roller bearings. A seal may be provided between the area of the axle housing in which the drive motor is located and the planetary gear train and the reduction gearsets. It is thereby easily possible to immerse the reduction gearsets and the planetary gear train in lubricant and to locate the drive motor in an engine compartment which is separated from the lubricant.

In one embodiment of the invention the drive motor may be formed as an electric motor or hydraulic motor. As a result of the ease of creating a seal between the engine compartment and the transmission components which must be supplied with lubricants, the drive axle of the invention is easier and more economical to construct than prior art drive axles. Moreover, with the elimination of a differential gearset, additional space in the axle housing is made available in the axial direction of the drive axle which can be used for the electric motor. It is thereby possible to install an electric motor which can produce greater power. Alternatively, if the power of the electric motor remains the same, the radial dimension of the electric motor and the diameter of the axle housing can be reduced. It is thereby possible, for example, to increase the ground clearance of a vehicle equipped with the drive axle of the invention.

In one embodiment of the invention, there is a braking device with a common brake actuator device in the planetary gear train. In drive axles of the prior art, in the range of high torques, there is a braking device with a brake actuator device on each of the output shafts. On the planetary gear train of the drive axle of the invention, the torques on the drive shaft and the two output shafts are easily achievable and accessible through a single braking device. It thereby becomes possible to install a single braking device with a brake actuator device, whereby the braking device acts directly on the output shafts. The cost of the drive axle of the invention is therefore lower than the drive axles of the prior art as a result of the elimination of components for the braking device.

The braking device may be located axially between the drive motor and the planetary gear train as a multi-disc brake. The installation of the braking device in the vicinity of the planetary gear train allows the use of a small braking device. The braking force is generated in the range of the power flow in which there are intermediate speeds of rotation and intermediate torques. The wear of the brake device can be further reduced by the use of a multi-disc brake which rotates in the lubricant used for the differential gearset.

The sun wheel and the planet carrier of the planetary gear train or the sun wheel and the ring gear of the planetary gear train may each be connected non-rotationally but axially movable to at least one brake disc. In an additional embodiment of the brake device, the ring gear and the planet carrier of the planetary gear train are each connected non-rotationally but axially movable to at least one brake disc. It thereby becomes possible to decelerate the input shaft and one of the two output shafts by a common braking device or to provide a braking device which acts directly on the components of the planetary gear train which are connected to the two output shafts.

Various systems can be used as the brake actuator device, namely hydraulic, pneumatic, electrical or mechanical systems. It is advantageous, however, if the brake actuator device is formed as a ring-shaped piston which, together with an axle housing, forms an annular chamber which can be pressurized with pressure medium. The braking device can also be a spring-loaded brake. The cost and complexity of the invention can therefore be reduced. Instead of two braking devices on the wheels or on the reduction gearsets of a drive axle, there is only one braking device with one brake actuator. The number of components is reduced and the manufacturing costs can be reduced by the elimination of a braking device. With the elimination of a braking device, additional space is made available in the axle housing in the axial direction for the existing components or for additional components.

The drive axle of the invention is particularly appropriate for use in an industrial truck, in particular for a counter-weight fork lift truck with an electrical or hydraulic propulsion system. As a result of the reduced space requirement and the use of a common transmission input stage with a differential gearset function and the resulting elimination of a separate differential gearset and the transmission input stages on the reduction gearsets, the space made available in the axle housing can be used for other components. It is possible, for example, to use the space saved in the axial direction for the installation of an electric motor. It is therefore possible to equip an industrial truck with a more powerful drive system. On the other hand, it is possible, using an electric motor of the same power, to reduce the dimensions of the electric motor and thus the dimensions of the axle housing in the radial direction. As a result, the ground clearance of the industrial truck can be increased.

The drive axle can also be located closer to the load suspension of a counterweight fork lift truck, which reduces the weight of the front part of the vehicle.

BRIEF DESCRIPTION OF THE DRAWINGS

Additional advantages and details of the invention are explained in greater detail below with reference to the embodiments illustrated in the accompanying schematic figures, in which.

DETAILED DESCRIPTION OF THE PREFERRED EMBODIMENTS

Figure 1:
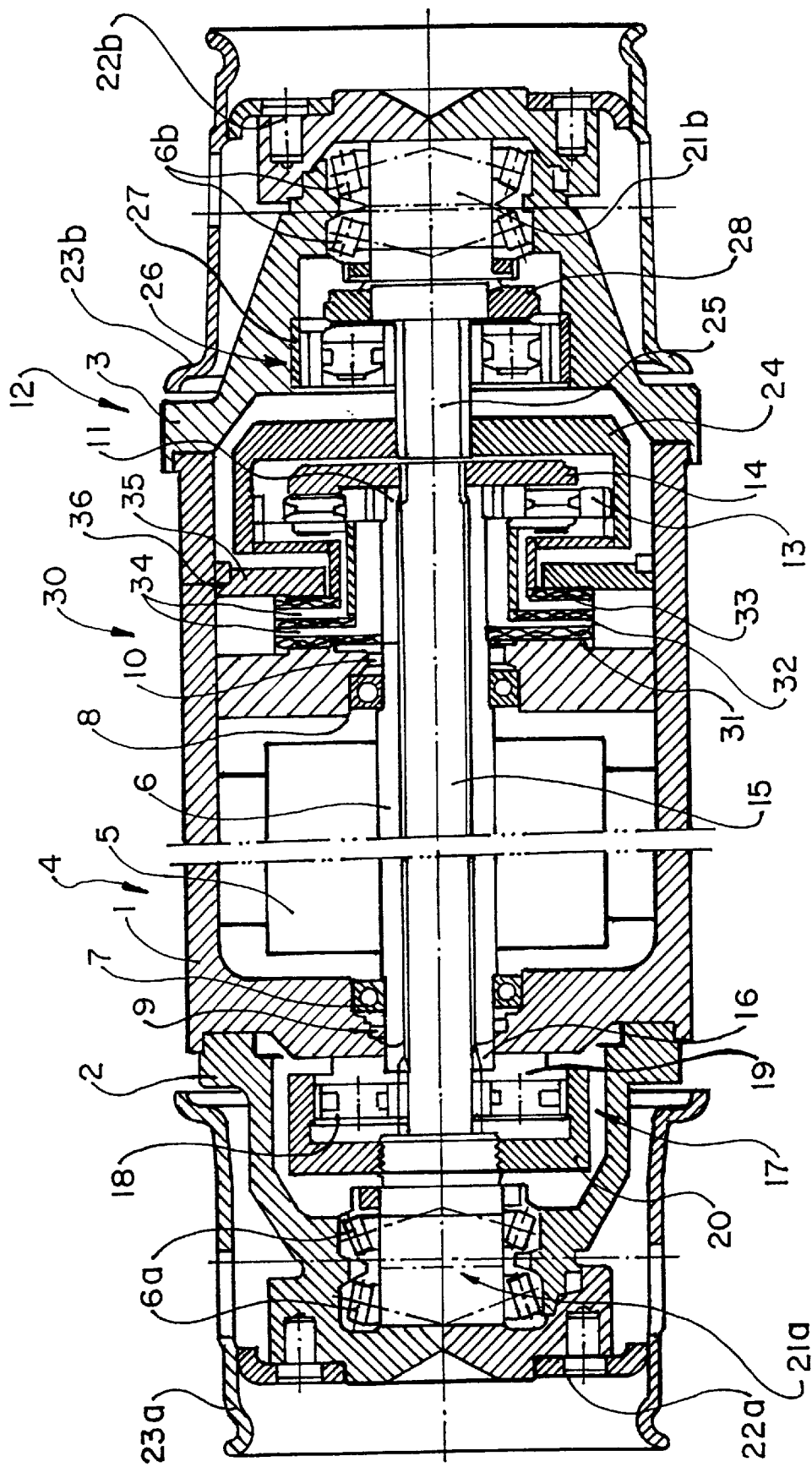
FIG. 1 is a longitudinal section through a drive axle of the invention.

FIG. 1 shows a drive axle of the invention with an axle housing 1, connected to the respective outer ends of which there are housings 2 and 3 with reduction gearsets 17, 26 located inside, housings 2 and 3, respectively. In the axle housing 1, there is an electric motor 4, the rotor 5 of which is non-rotationally connected to an input shaft 6. Input shaft 6 is a a hollow shaft and drives a single-stage planetary gear train 12. The input shaft 6 is rotatably mounted by roller bearings 7, 8 in the axle housing 1. The area of the axle housing 1 in which the drive motor 4 is located is sealed by seals 9 and 10.

The input shaft 6, on its end closer to the planetary gear train 12, has gear teeth which forms sun wheel 11 of the planetary gear train 12. The sun wheel 11 is connected to a plurality of planet wheels 13 which are rotationally mounted on a planet carrier 14 and roll along a ring gear 24. The planet carrier 14, through gear teeth, drives a first output shaft 15 which extends through the input shaft 6 toward the left side of the axle housing 1 as illustrated in FIG. 1. The ring gear 24 of the planetary gear train 12 is non-rotationally connected to a second output shaft 25 which extends toward the right side of the axle housing 1.

On the output shaft 15, on the end opposite the planetary gear train 12, there is a sun wheel 16, which can be made in one piece with the output shaft 15 and is part of the reduction gearset 17 which is formed as a single-stage planetary gear train. The planet wheels 18 of the reduction gearset 17 are rotationally located on a planet carrier 19, the drive lugs of which are molded on the axle housing 1 or are non-rotationally connected to it. The ring gear 20 of the reduction gearset 17 is in a drive connection with a final output shaft 21a.

The output shaft 25 which is connected to the ring gear 24 of the differential transmission 12 is also formed as a sun wheel of a single-stage planetary gear train which represents reduction gearset 26 for the right-hand area of the drive axle as illustrated in FIG. 1. The ring gear 27 of the reduction gearset 26 is non-rotationally connected to the housing 3. It is also possible to mold the ring gear 27 onto the inside wall of the housing 3. The planet carrier 28 is provided as the output element of the step-down transmission or reduction gearset 26, and is connected to the final output shaft 21b by gear teeth.

Molded onto each final output shaft 21a, 21b are respective wheel flanges 22a, 22b which are provided for the mounting of respective wheel rims 23a, 23b. The final output shafts 21a, 21b are rotationally mounted in the wheel hub housings 2 and 3 by bearing systems 6a and 6b, respectively.

Between the electric motor 4 and the planetary gear train 12 there is a braking device 30. The braking device 30 can be a multi-disc brake, for example, which has a plurality of brake discs 31, 32 and 33. The brake disc 31 is fastened on the input shaft 6 which forms sun wheel 11 of the differential transmission 12 so that the brake disc 31 cannot rotate relative thereto, but can move axially. The brake discs 32 and 33 are connected in the same manner to the planet carrier 14 and to the ring gear 24 of the differential transmission 12. Between each pair of the brake discs 31 to 33 there is a respective brake disc 34 which is also non-rotationally but axially movable connected to the axle housing 1 or to a component which is non-rotationally connected to the axle housing. It is sufficient to equip the input shaft 6 and either the planet carrier 14 or the ring gear 24 with a brake disc. It is also possible to provide a brake disc only on the planet carrier 14 and the ring gear 24. It is also possible to provide a plurality of each brake disc 31, 32 and 33, in which case each brake disc 31–33 would consist of a package of brake discs. The brake actuator comprises a ring-shaped piston 35 which, together with the axle housing 1, forms an annular piston chamber 36 which can be pressurized by hydraulic fluid.

The electric motor 5, through the input shaft 6, drives the sun wheel 11 of the planetary gear train 12. The reduction gearsets 17 and 26 are driven by the output shafts 15 and 25, which are effectively connected to the planet carrier 14 and the ring gear 24 of the differential gearset 12. This configuration makes it possible to achieve an equalization of the speeds of rotation of the driven wheels and to integrate a first gear ratio reduction in the planetary gear train. The different speeds and directions of rotation of the planet carrier 14 and the hollow shaft 24 and thus of the output shafts 15, 25 are equalized by different gear ratios in the reduction gearsets 17 and 26. The drive axle thereby has a total of only three respective single-stage planetary gear trains 12, 17 and 26, as a result of which the complexity and cost of the drive axle can be reduced significantly.

Figure 2:
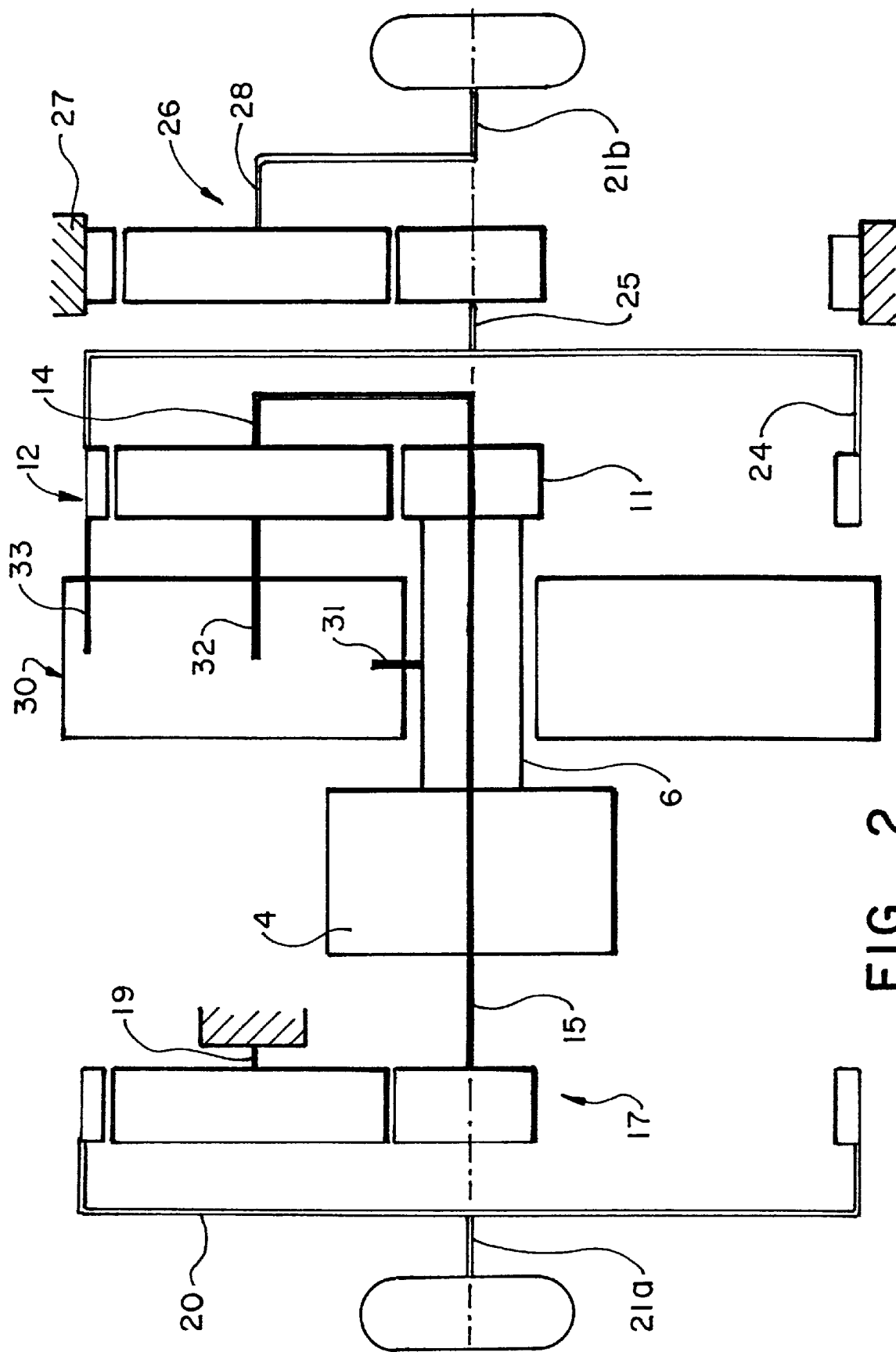
FIG. 2 is a schematic illustration of the drive axle illustrated in FIG. 1.

FIG. 2 is a schematic illustration of the drive axle illustrated in FIG. 1, with a drive motor 4 which, through input shaft 6, drives the sun wheel 11 of the planetary gear train 12. The planet carrier 14 and the ring gear 24 of the planetary gear train 12 are each connected to respective output shafts 15 and 25, which simultaneously form the sun wheel 11 of the reduction gearsets 17 and 26 which are also single stage planetary gear trains. The planet carrier 19 of the left-hand reduction gearset 17 in FIG. 2 is fastened non-rotationally to the axle housing 1, as a result of which the output to the final output shaft 21a takes place by the ring gear 20. On the reduction gearset 26, illustrated on the right in FIG. 2, the ring gear 27 is non-rotationally fastened in a housing component, so that the final output shaft 21b is effectively connected to the planet carrier 28.

Figure 3:
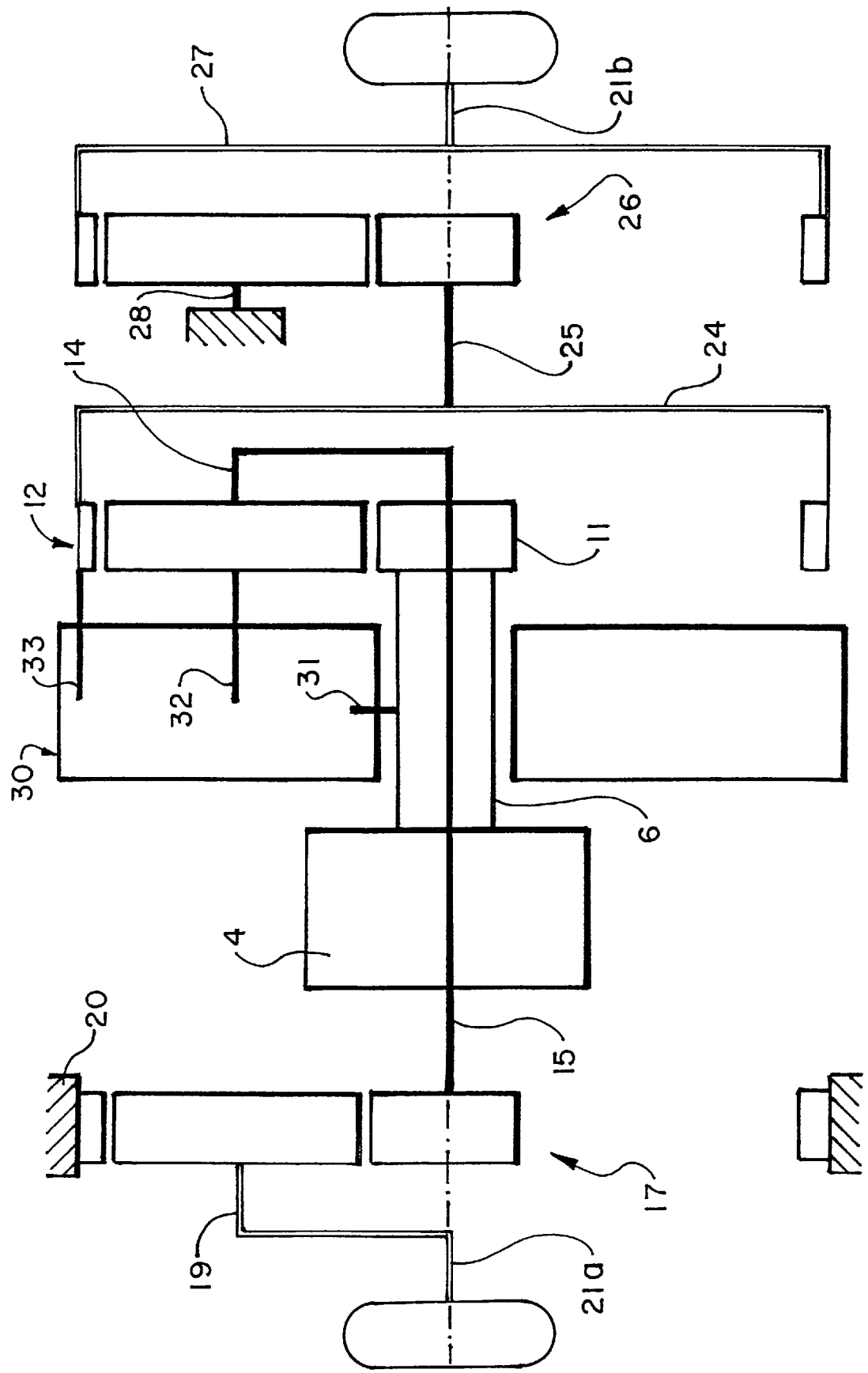
FIG. 3 is a schematic illustration of one variant of the drive axle of the invention.

FIG. 3 illustrates a variant of a drive axle of the invention, whereby the location of the output elements of the reduction gearsets 17 and 26 has been changed from the layout illustrated in FIG. 2. On the left-hand reduction gearset 17, the final output shaft 21a is driven by the planet carrier 19, whereby the ring gear 20 is non-rotationally mounted on the axle housing. On the right-hand reduction gearset 26 in FIG. 3, the planet carrier 28 is fastened to the housing 3 or component thereof, so that the final output shaft 21b is rotationally connected to the ring gear 27.

FIGS. 2 and 3 show that the different speeds and directions of rotation of the output shafts 15 and 25 can be equalized in a simple manner by two different reduction gearsets 17, 26 which are in the form of single-stage planetary gear trains by a suitable selection of the output elements of the reduction gearsets 17, 26. If a lower reduction from the drive motor 4 to the driven wheel is necessary, for example on account of the use of a low-speed drive motor, it is also possible for an output shaft to be effectively connected directly to the final output shaft. To achieve the same direction and speed of rotation of the second output shaft, the other output shaft is connected to a single-stage reduction gearset, for example, a planetary gear train, the ring gear or planet carrier which is connected to the final output shaft.

Figure 4:
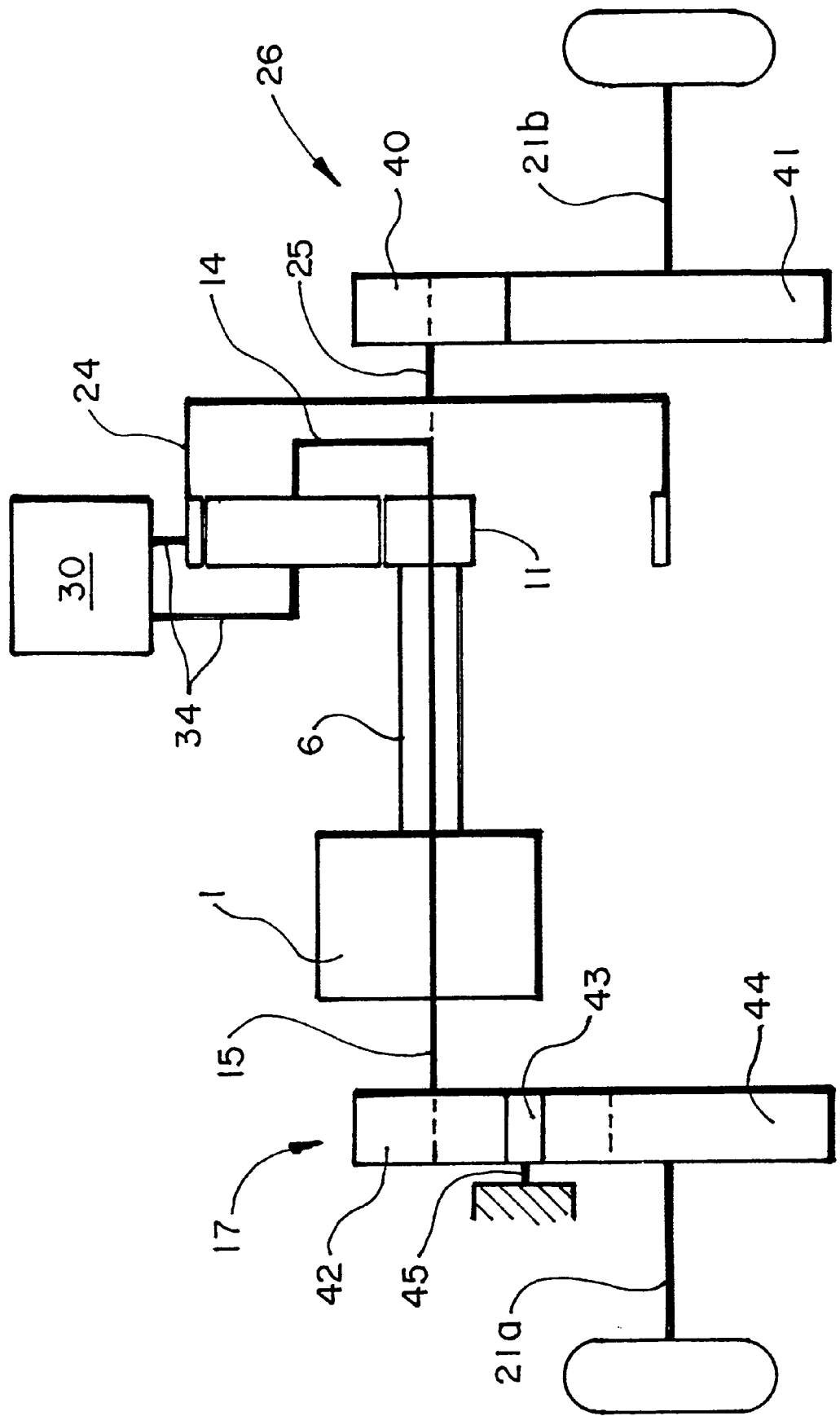
FIG. 4 is a schematic illustration of another variant of the drive axle of the invention.

FIG. 4 illustrates another variant of the drive axle of the present invention. In FIG. 4, reduction gear sets 17 and 26 are in the form of single stage spur gear systems. The reduction gear set 26 has a pair of gear wheels including the gear wheel 40 and the gear wheel 41. The gear wheel 40 is non-rotationally connected to the output shaft 25 and the gear wheel 41 is in a driving connection with the final output shaft 21b. The reduction gearset 17 has a gear wheel 42 which is connected with the output shaft 15 and a gear wheel 44 which is in connection with the final output shaft 21a. An intermediate gear wheel 43 is located between the gear wheels 42 and 44. The intermediate gear wheel 43 is rotationally mounted on a journal 45 which can be fastened, for example, to the axle housing 1. As a result of the intermediate gear wheel 43, a reversal of direction is achieved on the reduction gearset 17. This provides a simple manner for compensating for the different rotation directions of the output shafts 15 ans 25 when the reduction gear sets are formed as spur gear systems. Braking device 30 with brake discs 34 may be located radially outside the planetary gearset 12.

It can be seen that various modifications may be made to the present invention without departing from the spirit and scope thereof. The scope of the present invention is defined by the appended claims.

It is claimed:

1. A drive axle with a drive motor and two reduction gearsets located on the ends of the axle whereby each reduction gearset is provided for the drive of a respective wheel, and the power flow from the drive motor to the driven wheel is by one input stage and at least one final stage of the reduction gearsets and wherein the input stages of the reduction gearset is a common, single-stage planetary gear train which is connected by respective output shafts to the final stages of the two reduction gearsets, wherein the planetary gear train has a rotatable sun wheel, a rotatable planet carrier and a rotatable ring gear.

2. The drive axle as claimed in claim 1 wherein a rotatable component of the planetary gear train is in a drive connection with an input shaft and each additional rotatable component of the planetary gear train is connected to one of the output shafts to drive the reduction gearsets.

3. A drive axle with a drive motor and two reduction gearsets located on the ends of the axle whereby each reduction gearset is provided for the drive of a respective wheel, and the power flow from the drive motor to the driven wheel is by one input stage and at least one final stage of the reduction gearsets and wherein the input stages of the reduction gearsets is a common, single stage planetary gear train which is connected by respective output shafts to the final stages of the two reduction gearsets, wherein the planetary gear train has a rotatable sun wheel, a rotatable planet carrier and a rotatable ring gear, whereby a rotatable component of the planetary gear train is in a drive connection with an input shaft and each additional rotatable component of the planetary gear train is connected to one of the output shafts to drive the reduction gearsets, and wherein the sun wheel of the planetary gear train is connected to the input shaft, and the planet carrier is in a drive connection with a first output shaft and the ring gear of the planetary gear train is in a drive connection with a second output shaft.

4. A drive axle with a drive motor and two reduction gearsets located on the ends of the axle whereby each reduction gearset is provided for the drive of a respective wheel, and the power flow from the drive motor to the driven wheel is by one input stage and at least one final stage of the reduction gearsets and wherein the input stages of the reduction gearsets is a common, single stage planetary gear train which is connected by respective output shafts to the final stages of the two reduction gearsets, wherein the planetary gear train has a rotatable sun wheel, a rotatable planet carrier and a rotatable ring gear, whereby a rotatable component of the planetary gear train is in a drive connection with an input shaft and each additional rotatable component of the planetary gear train is connected to one of the output shafts to drive the reduction gearsets, and wherein the input shaft is in a drive connection with the ring gear of the planetary gear train, wherein the sun wheel of the planetary gear train is connected to a first output shaft and the planet carrier of the planetary gear train is connected to a second output shaft.

5. The drive axle as claimed in claim 1 wherein the reduction gearsets are single-stage planetary gear trains.

6. A drive axle with a drive motor and two reduction gearsets located on the ends of the axle whereby each reduction gearset is provided for the drive of a respective wheel, and the power flow from the drive motor to the driven wheel is by one input stage and at least one final stage of the reduction gearsets and wherein the input stages of the reduction gearsets is a common, single stage planetary geartrain which is connected by respective output shafts to the final stages of the two reduction gearsets, wherein the reduction gearsets are single-stage planetary gear trains, and wherein the output shafts are respective sun wheels of the reduction gearsets, wherein the output of the first reduction gearset is via the planet carriers and a ring gear of the first reduction gearset is stationary relative to the axle housing, and wherein the output of the second reduction gearset is via the ring gear thereof and a planet carrier of the second reduction gearset is stationary relative to the axle housing.

7. A drive axle with a drive motor and two reduction gearsets located on the ends of the axle whereby each reduction gearset is provided for the drive of a respective wheel, and the power flow from the drive motor to the driven wheel is by one input stage and at least one final stage of the reduction gearsets and wherein the input stages of the reduction gearsets is a common, single stage planetary geartrain which is connected by respective output shafts to the final stages of the two reduction gearsets, wherein the reduction gearsets are single stage spur gearsets, and wherein one said spur gearset includes a reversal of direction of the output shaft.

8. The drive axle as claimed in claim 7 wherein the spur gearsets each have a pair of gear wheels, and wherein one spur gearset includes an intermediate wheel located between the pair of gear wheels.

9. The drive axle as claimed in claim 1 wherein the input shaft is a hollow shaft and is oriented coaxial to the output shafts, and surrounds one output shaft.

10. A drive axle with a drive motor and two reduction gearsets located on the ends of the axle whereby each reduction gearset is provided for the drive of a respective wheel, and the power flow from the drive motor to the driven wheel is by one input stage and at least one final stage of the reduction gearsets and wherein the input stages of the reduction gearsets is a common, single stage planetary geartrain which is connected by respective output shafts to the final stages of the two reduction gearsets, wherein the input shaft is a shaft of the drive motor located in the axle housing, and is supported by the axle housing by roller bearings, and the area of the axle housing in which the drive motor is located is sealed off from the planetary gear train and the reduction gearsets by a pair of seals.

11. A drive axle with a drive motor and two reduction gearsets located on the ends of the axle whereby each reduction gearset is provided for the drive of a respective wheel, and the power flow from the drive motor to the driven wheel is by one input stage and at least one final stage of the reduction gearsets and wherein the input stages of the reduction gearsets is a common, single stage planetary geartrain which is connected by respective output shafts to the final stages of the two reduction gearsets, further including a braking device with a common brake actuator device located on the planetary gear train.

12. The drive axle as claimed in claim 11 wherein the braking device is located axially between the drive motor and the planetary gear train and is a multi-disc brake.

13. The drive axle as claimed in claim 12 wherein the sun wheel and the ring gear of the planetary gear train are each non-rotatably and axially moveably connected with at least one brake disc.

14. The drive axle as claimed in claim 12 wherein the sun wheel and the planet carrier of the planetary gear train are each connected non-rotationally and axially movable with at least one brake disc.

15. The drive axle as claimed in claim 12 wherein the ring gear and the planet carrier of the planetary gear train are each non-rotationally and axially movable connected to at least one brake disc.

16. The drive axle as claimed in claim 12 wherein an actuator device of the braking device is a ring-shaped piston which, together with the axle housing, forms an annular chamber which can be pressurized with pressure medium.

17. A drive axle for driving two respective wheels, said drive axle comprising:
a drive motor;
a common single stage planetary gear train driven by said motor, said planetary gear train having two output shafts, a rotatable sun wheel, a rotatable planet carrier and a rotatable ring gear; and
a pair of reduction gearsets, each said reduction gearset driving one respective wheel and driven by one said output shaft of said common single planetary gear train.

18. The drive axle of claim 17 wherein said drive axle is for use in a counterweight forklift.

19. A drive axle for driving two respective wheels, said drive axle comprising:
a drive motor;
a common, single stage planetary gear train driven by said motor, said planetary gear train having two output shafts;
a pair of reduction gearsets, each said reduction gearset driving one respective wheel and driven by one said output shaft of said common, single planetary gear train; and
a braking device and a common brake actuator positioned on said common single stage planetary gear train.

20. The drive axle of claim 17 wherein each said gearset is a single stage planetary gear train.

* * * * *